United States Patent
Lewis et al.

(10) Patent No.: US 12,116,032 B2
(45) Date of Patent: *Oct. 15, 2024

(54) WELDING CART WITH CABLE MANAGEMENT SYSTEM

(71) Applicant: Harbor Freight Tools USA, Inc., Calabasas, CA (US)

(72) Inventors: Ryan Lewis, Newbury Park, CA (US); Jonathan Cardenas, Camarillo, CA (US); Anthony Ponce, Simi Valley, CA (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,137

(22) Filed: Apr. 27, 2023

(65) Prior Publication Data

US 2023/0286564 A1  Sep. 14, 2023

Related U.S. Application Data

(63) Continuation of application No. 16/538,591, filed on Aug. 12, 2019, now Pat. No. 11,673,593.

(51) Int. Cl.
*B62B 3/10* (2006.01)
*B23K 37/02* (2006.01)

(52) U.S. Cl.
CPC ............ *B62B 3/10* (2013.01); *B23K 37/0205* (2013.01); *B23K 37/0294* (2013.01); *B62B 2202/48* (2013.01)

(58) Field of Classification Search
CPC ......... B62B 3/10; B62B 2202/48; B62B 3/02; B62B 5/06; B23K 37/0205; B23K 37/0294; B23K 9/327
See application file for complete search history.

(56) References Cited

U.S. PATENT DOCUMENTS

| | | | | |
|---|---|---|---|---|
| 1,563,057 A | * | 11/1925 | Williams | ................ B62B 3/006 211/168 |
| 2,599,670 A | * | 6/1952 | Thomas | .................. E04G 1/154 182/152 |
| 3,874,531 A | * | 4/1975 | Mayo | ........................ B62B 3/10 280/47.35 |
| 4,458,963 A | * | 7/1984 | Keddie | .................. A47C 13/00 312/902 |

(Continued)

*Primary Examiner* — Ko H Chan
(74) *Attorney, Agent, or Firm* — Lathrop GPM LLP; Richard Beem; Alex Shtraym (57) ABSTRACT

A welding cart with a cable management system may include a frame, a shelf adapted to support a welding machine, a plurality of upright members, a plurality of wheels supporting the cart, one or more pairs of holders disposed on one or more sides of the cart, and a removable bar that may be releasably secured to the one or more pairs of holders. The bar may be releasably secured to the holders via a pin-and-hole mechanism and may have a hook adapted to hold welding equipment such as cables. The bar may be releasably secured to a first pair of holders disposed on a side of the cart or a second pair of holders disposed on another side of the cart. This system provides additional, easily accessible storage space for welding tools and accessories while still being compatible with a wide variety of portable welding machines.

23 Claims, 4 Drawing Sheets

(56) References Cited

U.S. PATENT DOCUMENTS

| | | | | |
|---|---|---|---|---|
| 5,372,339 A * | 12/1994 | Morgan | ............ | B64D 9/00 |
| | | | | 296/19 |
| 5,383,629 A * | 1/1995 | Morgan | ............ | B64D 11/00 |
| | | | | 244/118.6 |
| 6,095,347 A * | 8/2000 | Mauro-Vetter | ...... | B65G 1/02 |
| | | | | 211/151 |
| 6,669,214 B1 * | 12/2003 | Domis | ............ | B25H 3/00 |
| | | | | 280/47.35 |
| 7,241,973 B1 * | 7/2007 | Di Novo | ............ | B23K 37/02 |
| | | | | 219/136 |
| 7,357,398 B2 * | 4/2008 | O'Connor | ............ | B62B 3/104 |
| | | | | 280/47.35 |
| 7,661,685 B2 * | 2/2010 | Thibault | ............ | B62B 5/085 |
| | | | | 280/47.35 |
| 8,210,312 B1 * | 7/2012 | Tetreault, Jr. | ............ | E04G 1/34 |
| | | | | 182/119 |
| 8,653,416 B2 * | 2/2014 | Laitala | ............ | B23K 9/1006 |
| | | | | 219/133 |
| 8,748,777 B2 * | 6/2014 | Ertmer | ............ | B23K 9/32 |
| | | | | 219/136 |
| 8,919,582 B1 * | 12/2014 | Kmetz, III | ............ | B62B 3/10 |
| | | | | 211/85.8 |
| 9,333,596 B2 * | 5/2016 | Luis y Prado | ............ | B25H 3/00 |
| 10,817,849 B1 * | 10/2020 | Nicoll | ............ | A47F 1/04 |
| 2004/0227315 A1 * | 11/2004 | Van Landingham, Jr. | ............ | |
| | | | | A47B 31/00 |
| | | | | 280/47.35 |

* cited by examiner

WELDING CART WITH CABLE MANAGEMENT SYSTEM

CROSS-REFERENCE TO RELATED APPLICATION

This application is a continuation of U.S. application Ser. No. 16/538,591 filed on Aug. 12, 2019, which is incorporated by reference in its entirety.

BACKGROUND

Welding

Welding is the process of joining two or more metals by heating the surfaces of the metals to the point of melting. Welding has many applications and is used in many industries such as the automotive industry, construction industry, and manufacturing industry. For example, in the automotive industry, welding can be used to bond heat shields, exhaust systems, chassis, and hydraulic lines. In the construction industry, welding can be used to form connections in buildings bridges, and other infrastructure. In the manufacturing industry, welding can be used to form furniture pieces such as office desks and file cabinets, HVAC units such as heating, ventilation, and air conditioning units, and frames for farm equipment.

There are many types of welding processes, the main types being MIG welding, TIG welding, arc welding, and flux core arc welding. Each of these welding processes produces different weld properties and, as such, each welding process is best suited for certain applications. For example, TIG welding produces high quality, precise welds and can be used for welding a variety of metals. MIG welding, on the other hand, uses wire as a filler to produce cleaner welds better suited for metals such as steel and aluminum.

Welding Machines

Different welding processes require different welding machines. For example, MIG and flux welding requires a MIG-type welding machine and TIG welding requires a TIG-type welding machine. Examples of portable MIG welding machines include the VULCAN OMNIPRO 220, MILLER MULTIMATIC 255, and LINCOLN ELECTRIC POWER MIG 210.

Because wire feed (MIG) welding uses wire as a filler to join two metals, MIG welding machines must continuously feed wire onto the workpiece during welding. As such, MIG welding machines house a replaceable spool of wire inside the machine. When the wire is depleted, the wire spool must be replaced with a new one. In most MIG machines, the wire spool can be accessed by lifting a door on the side of the machine. The side on which the door is located may differ between welding machines. The door therefore may be disposed on the right side of one welding machine and the left side of another. For example, the door of the VULCAN OMNIPRO 220 is located on the right side of the welding machine while the door of the MILLER ELECTRIC MULTIMATIC 255 is located on the left side.

Wire feed welding machines may come in varying sizes. Some welding machines are small enough to be considered portable. While portable machines are relatively smaller than larger industrial welding machines, they still may be too large and heavy for one person to conveniently transport. As such, a welding cart is usually needed to hold and transport portable welding machines.

Welding Carts

Many conventional welding carts have a surface for supporting a welding machine, but lack sufficient storage space for welding tools and accessories, such as helmets, torches, cables, leads, gas hoses, and replacement wire spools. Further, any limited storage space that is available may not be easily accessible.

Welding cables, leads, and gas hoses (collectively called "cables") can be particularly difficult to store because they are thick and long. For example, a welding cable may be between about 5 feet and about 25 feet long. Typically, when the cables are not in use, they are wrapped around the welding machine, hung over the handles of welding cart, or set on the bottom upper shelf of welding cart. These cable storage methods can be difficult, disorganized, and unsecure. As an alternative, cables may also be stored on a wall or other separate surface. This method makes shutdown and startup more difficult and time consuming because the cables must be attached and detached from the welding machine with every use.

SUMMARY

A welding cart with a cable management system may include an upper shelf, a lower shelf disposed below the upper shelf, a frame, a plurality of upright members, a plurality of wheels supporting the cart, and a cable management system.

The cable management system may include a first pair of holders disposed on a side of the cart. The first pair of holders may further include a mounting arm and a support arm, and the support arm may further include a hole adapted to receive a pin on a bar.

The cable management system may further include a second pair of holders disposed on a side of the cart. The second pair of holders may be disposed on a side of the cart opposite the first pair of holders. The second pair of holders may further include a mounting arm and a support arm, and the support arm may further include a hole adapted to receive a pin on a bar.

The cable management system may further include a bar. The bar may include a hook. The hook may have a prong adapted for securing cables and other tools on the hook. The bar may further include a pin adapted to fit into a hole in the support arm of a holder. The bar may include two pins disposed on opposite ends of the bar and each adapted to fit into a corresponding hole in adjacent holders.

The bar may be releasably secured to the first pair of holders or the second pair of holders. Whether the bar is releasably secured to the first pair of holders or the second pair of holders may depend on the specific needs of the user or the configuration of the welding machine. Specifically, the bar may be releasably secured to a pair of holders disposed on the side of the cart opposite the door of the welding machine.

For example, if the first pair of holders is disposed on the same side of the cart as the door of the welding machine, the bar may be placed on the second pair of holders disposed on the opposite side of the cart. Accordingly, the space in front of the door may remain clear such that the door may be freely opened and closed. If, on the other hand, the second pair of holders is disposed on the same side of the cart as the door of the welding machine, the bar may be placed on the first pair of holders.

Further, the bar may be freely transferred between the first pair of holders and second pair of holders as needed.

This flexibility of the cable management system gives the welding cart increased storage capacity while also allowing the welding cart to be used with various types and configurations of welders.

Other systems, methods, features, and technical advantages of the invention will be, or will become apparent to one with skill in the art, upon examination of the figures and detailed description. It is intended that all such additional systems, methods, features and technical advantages be included within this summary and be protected by the claims.

DETAILED DESCRIPTION OF THE DRAWINGS 1.0 Welding Cart Overview

Figure 1:
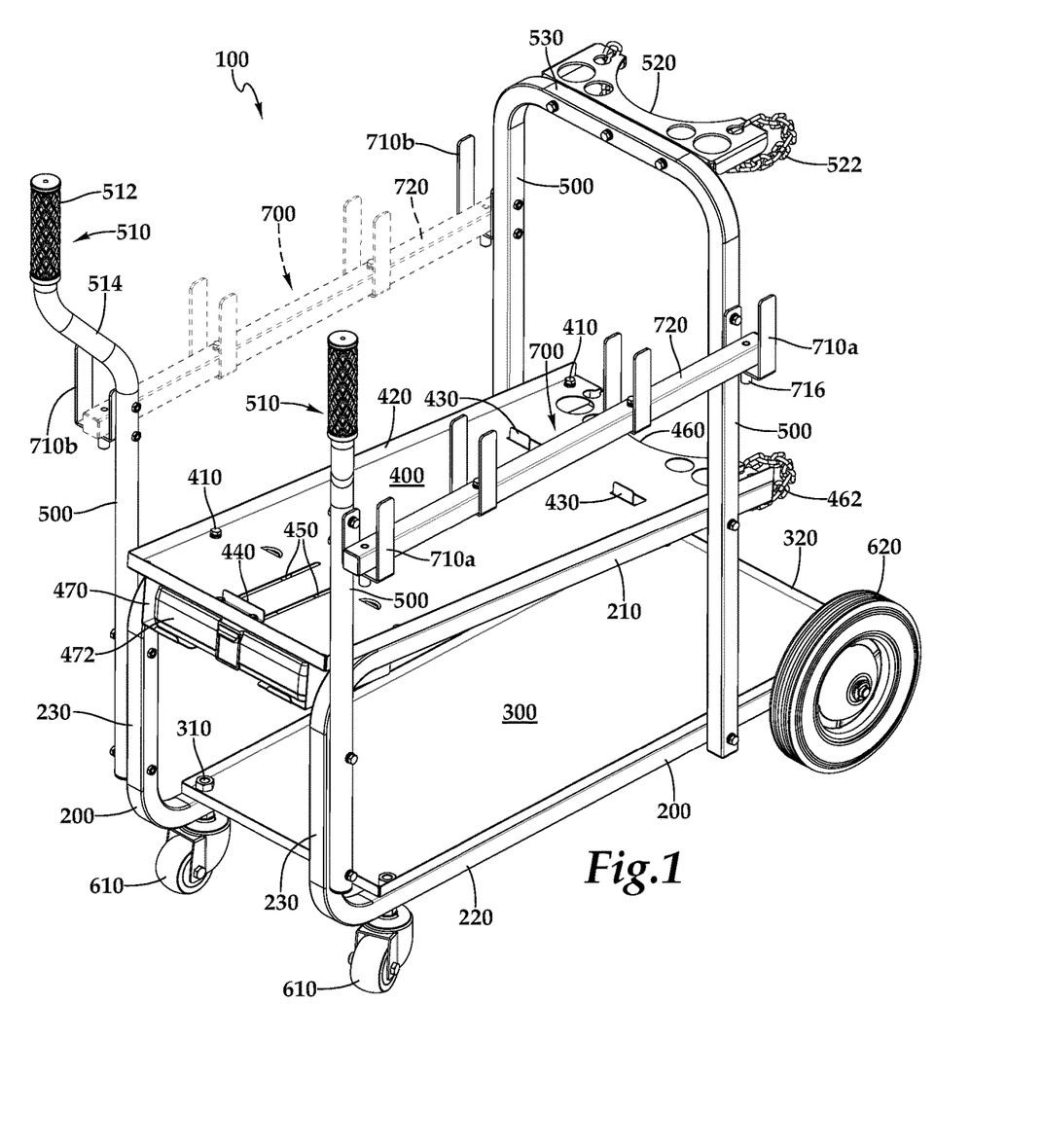
FIG. 1 is a front perspective view of an exemplary welding cart with the bar of an exemplary cable management system disposed on the near side of the welding cart. An exemplary bar is also represented in broken lines on the far side of the cart to illustrate that the bar can be placed on either side of the welding cart.

Referring to the drawings and initially to FIG. 1, a perspective view of an exemplary welding cart 100 is shown. Welding cart 100 may include a frame, which may further include one or more support frames 200, a lower shelf 300 attached to each support frame 200, an upper shelf 400 attached to each support frame, a plurality of upright members 500 two of which may include a handle 510, a plurality of wheels or casters 610, 620 supporting the cart, and a transferable cable management system 700 that includes a first pair of holders 710a disposed on a side of the welding cart 100, a second pair of holders 710b disposed on an opposite side of the welding cart 100, and a bar 720 releasably secured to either the first pair of holders 710a or the second pair of holders 710b, the bar having at least one hook 730.

Figure 6:
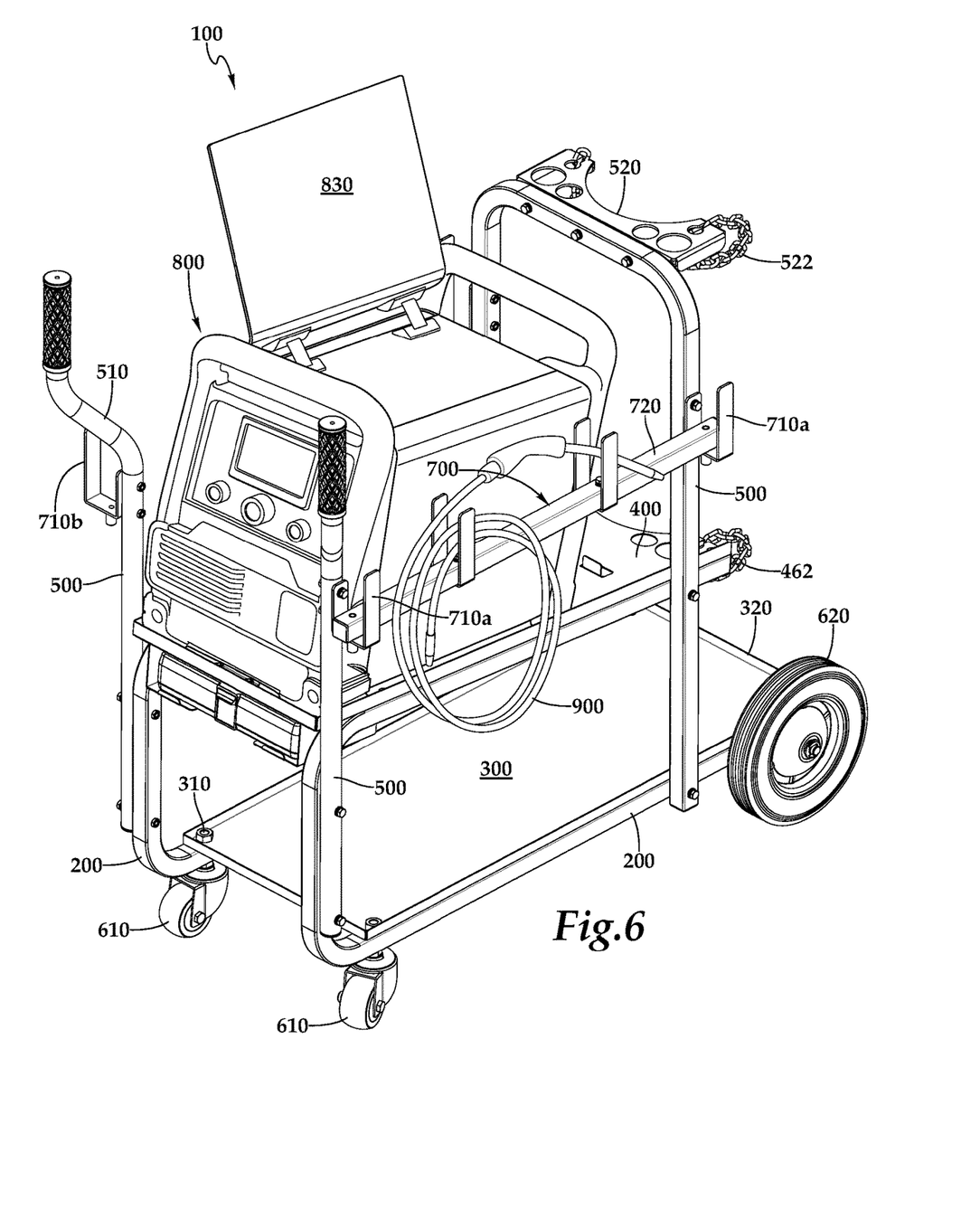
FIG. 6 is a front perspective view of a welding cart supporting a portable welding machine and having an exemplary cable management system disposed on the near side of the cart.

Referring to FIG. 6, in operation, upper shelf 400 of welding cart 100 may be used to support a welding machine 800. Welding machine 800 may be a portable wire feed welding machine which feeds wire through a cable and out a nozzle located at the tip of a torch. A wire spool may be disposed on spindle located inside welding machine 800 and accessed by lifting hinged door 830 disposed on the side of welding machine 800, as shown in FIG. 6.

When the wire on wire spool is depleted, the wire spool may be replaced—a process that requires opening the welding machine door 830. When replacing the wire spool, door 830 must be pulled outward and upward, and lifted above welding machine 800, as shown in FIG. 6. Thus, the space in front of door 830 must be clear of any objects during replacement of the wire spool. As described above, the door may be located on different sides of different welding machines.

Welding requires the use of many tools and accessories, such as helmets, cables, leads, hoses, and wire spools. While lower shelf 300 of welding cart 100 may be able to hold some of these objects, additional space may be required. As described above, cables are particularly difficult to store on welding carts because of their length and thickness. A cable management system 700 located on the side of welding cart 100 may provide additional, easily-accessible storage space for welding tools and accessories, such as cables 900.

As further described above, because the door of the welding machine may be located on different sides of different welding machines, a rack fixed on one side of welding cart 100 may limit use of the cart to certain welding machines.

A welding cart may therefore include a cable management system 700 that can be placed on either side of the welding cart 100. The side of the welding cart on which the cable management system 700 is placed may depend on the configuration of the welding machine 800 disposed on the cart 100. For example, if the door 830 is located on one side of the welding machine 800, then the cable management system 700 may be located on an opposite side of the welding cart 100 such that the door 830 of the welding machine 800 may be freely opened.

2.0 Exemplary Frame

The welding cart may include a frame. The frame may be adapted to support a welding machine disposed on an upper shelf. As shown in FIG. 1, the frame may include one or more support frames 200. For example, as shown in FIG. 1, the frame may include a pair of support frames 200. Each support frame 200 may have an upper arm 210, a lower arm 220. Upper and lower arms 210, 220 may be substantially horizontal. Further, a substantially vertical arm 230 may be configured to connect one end of upper arm 210 to one end of lower arm 220. The length of upper arm 210 may be substantially equal to the length of lower arm 220, or alternatively, upper arm 210 may be shorter in length than lower arm 220, as shown in FIG. 1. Each substantially vertical arm 230 may have a height. Each support frame may have one or more additional substantially vertical arms connecting upper arm 210 and lower arm 220 for added stability. For example, a support frame 200 may have two substantially vertical arms connecting the upper arm and lower arm of the support frame such that the support frame forms a rectangular shape.

In one embodiment, the upper arm 210 and lower arm 220 of each support frame 200 may be substantially parallel to one another. Alternatively, as shown in FIG. 1, upper arm 210 of each support frame 200 may be oblique to corresponding lower arm 210 of each support frame 200.

As shown in FIG. 1, support frames 200 may be disposed on opposite sides of a lower shelf 300. The support frames 200 may further be disposed such that the substantially vertical arm 230 of each support frame 200 is disposed substantially normal to the lower shelf 300 and such that upper arm 210 is positioned above lower arm 220.

In one embodiment, as shown in FIG. 1, the lower arm 220 of each support frame 200 may be attached to opposing sides of lower shelf 300. For example, the lower arm 220 of one support frame 200 may be attached to one side of the lower shelf 300 and the lower arm 220 of the opposing support frame 200 may be attached to an opposite side of the lower shelf 300.

In one embodiment, as shown in FIG. 1, lower shelf 300 may be disposed on top of lower arms 220 of support frames 200. Alternatively, lower shelf 300 may be positioned beneath lower arms 220 of support frames 200. Alternatively, opposing side surfaces of lower shelf 300 may be attached to an inside surface of each lower arm 220.

The support frames 200 may be attached to lower shelf 300 by any suitable attachment mechanism such as a nut and bolt assembly 310 as shown in FIG. 1, or a cotter pin. The support frames 200 may further be connected to each other by one or more crossbars that extend between the support frames 200 for additional stability. For example, one or more crossbars may connect both upper arms 210 of support frames 200. Additionally or alternatively, one or more crossbars may connect both substantially vertical arms 230 of support frames 200.

The support frames 200 may further include one or more holes through which bolts, axles or other elongated components may be inserted. Each hole in a support frame may pass through a portion of the support frame 200 or may pass entirely through the support frame 200. In one embodiment, the lower arm 210 of each support frame may include a hole. Further, a hole in lower arm 220 of one support frame 200 may align with a hole in lower arm 220 of an opposing support frame 200 such that an axle or other elongated member may be inserted through the holes and connect the support frames 200.

3.0 Exemplary Lower Shelf 300

As shown in FIG. 1, welding cart 100 may include a lower shelf 300 connected to support frames 200. As described more fully above, and as shown in FIG. 1, lower shelf 300 may be disposed on top of the lower arm 220 of each support frame 200. Alternatively, lower shelf 300 may be disposed underneath the lower arm 220 of each support frame 200. Alternatively, opposing side surfaces of lower shelf 300 may be attached to an inside surface of each lower arm 220.

As described above, lower shelf 300 may be connected to support frames 200 by any suitable attachment mechanism, such as a nut and bolt assembly 310, as shown in FIG. 1, or a cotter pin. As shown in FIG. 1, lower shelf 300 may be attached to the lower arms 220 of support frames 200 at points near the corners of lower shelf 300. Additionally or alternatively, lower shelf 300 may be attached to the lower arms 220 of support frames 200 at one or more points along the side of lower shelf 300.

Lower shelf 300 may have a length and a width and may be adapted to accommodate a portable welding machine. Lower shelf 300 may extend along a portion of the lower arms 220 of the support frames 200, or alternatively, as shown in FIG. 1, lower shelf 300 may extend along substantially the entire length of lower arms 220.

In addition to connecting support frames 200 and providing stability to welding cart 100, lower shelf 300 may be used as a surface on which to set welding tools and accessories, such as welding helmets, wire spools, or other objects. Optionally, as described more fully below, the lower shelf 300 may be adapted to support a gas cylinder. For example, one end of the lower shelf 300 may adapted to support a gas cylinder.

In one embodiment, as shown in FIG. 1, one or more sides of lower shelf 300 may include a lip 320 to prevent welding tools, welding accessories, gas cylinders or other objects placed on lower shelf 300 from falling off lower shelf 300.

4.0 Exemplary Upper Shelf 400

As shown in FIG. 1, welding cart 100 may further include an upper shelf 400 connected to support frames 200. Upper shelf 400 may be adapted to support a portable welding machine. As shown in FIG. 1, upper shelf 400 may be connected to support frames 200 such that upper shelf 400 is disposed on top of an upper arm 210 of each support frame. Alternatively, upper shelf 400 may be connected to the support frames 200 such that upper shelf 400 is disposed underneath upper arm 210 of each support frame 200. Alternatively, upper shelf 400 may also be connected to support frames 200 such that opposing side surfaces of upper shelf 400 are attached to an inside surface of each upper arm 210.

In one embodiment, upper shelf 400 may be disposed substantially horizontal on upper arms 210 of support frames 200. Alternatively, as shown in FIG. 1, upper shelf 400 may be disposed on upper arms 210 of support frames 200 such that upper shelf 400 is angled upward or downward. For example, upper shelf 400 may be tilted at an angle of between about 0° and about 30°. More preferably, upper shelf 400 may be tilted at an angle of between about 5° and about 25°. Even more preferably, upper shelf 400 may be tilted at an angle of between about 10° and about 20°. In one embodiment, upper shelf 400 may be tilted at an angle of about 15°.

Upper shelf 400 may be connected to support frames 200 by any suitable attachment mechanism, such as a nut and bolt assembly 410, as shown in FIG. 1, or a cotter pin. As shown in FIG. 1, upper shelf 400 may be attached to the upper arms 210 of support frames 200 at points near the corners of upper shelf 400. Additionally or alternatively, upper shelf 400 may be attached to the upper arms 210 of support frames 200 at one or more points along a side of upper shelf 400.

As shown in FIG. 1, upper shelf 400 of the welding cart 100 may have a length and a width. The length and width of the upper shelf may be adapted to hold a welding machine. The length and width of upper shelf 400 may further be adapted to hold a portable welding machine, such as a portable MIG welding machine. In one embodiment, the length and width of upper shelf 400 may be substantially equal. In one embodiment, the length of upper shelf 400 may be less than or equal to the length of lower shelf 300. As shown in FIG. 1, upper shelf 400 may extend along a portion of upper arms 210 of support frames 200 or along the entire length of upper arms 210 of support frames 200.

As shown in FIG. 1, one or more sides of upper shelf 400 may include an upwardly extending lip 420 to prevent the welding machine or other objects placed on upper shelf 400 from falling off upper shelf 400. Upper shelf 400 may also include one or more downward extending lips. The one or more downward extending lips may overlap the upper arm 210 of a support frame 200. The one or more downward extending lips may be connected to the corresponding upper arm 210.

As shown in FIG. 1, upper shelf 400 may further include one or more stationary tabs 430. The one or more stationary tabs 430 may extend upwards from upper shelf 400. A welding machine placed on upper shelf 400 may rest against the one or more stationary tabs 430 such that the welding machine may be secured in position on upper shelf 400 and prevented from sliding along upper shelf 400.

As shown in FIG. 1, upper shelf 400 may further include one or more adjustable tabs 440 extending upward from upper shelf 400. The one or more adjustable tabs 440 may be disposed opposite one or more stationary tabs 430. The one or more adjustable tabs 440 may be adjusted to rest against one end of a welding machine to secure the welding machine in place on upper shelf 400. The adjustable tabs 440 may further be adjusted such that they secure the welding machine against one or more opposing stationary tabs 430.

As shown in FIG. 1, adjustable tab 440 may be adjusted on upper shelf 400 by a slot mechanism. The slot mechanism may comprise one or more slots 450 in upper shelf 400 along which adjustable tab 440 slides. Adjustable tab 440 may therefore be adjusted along slots 450 to secure various sizes of welding machines on upper shelf 400.

As shown in FIG. 1, upper shelf 400 may further include one or more recesses 460 configured to receive a gas cylinder. In one embodiment, recess 460 in upper shelf 400 may be adapted to receive a gas cylinder disposed on lower shelf 300. Upper shelf 400 may further include a chain 462 for securing a gas cylinder in recess 460.

As shown in FIG. 1, upper shelf 400 may further include one or more compartments or holders 470 adapted to receive a toolbox 472. The compartment or holder 470 may be operatively connected to upper shelf 400, support frames 200, or both upper shelf 400 and support frames 200.

5.0 Exemplary Upright Members 500

As shown in FIG. 1, welding cart 100 may further include one or more upright members 500. The upright members 500 may be used for maneuvering the cart 100 or may provide additional stability to the welding cart 100. As shown in FIG. 1, each upright member 500 may be attached to a support frame 200. More specifically, each upright member 500 may be attached to a substantially vertical arm 230, upper arm 210, or lower arm 230 of a support frame 200. As shown in FIG. 1, each upright member 500 may be attached to a support frame 200 such that upright member 500 is disposed substantially vertically.

Each upright member 500 may have a height. Each upright member may be attached to a support frame 200 at one or more points along the length of the support frame 200, or at one or more points along the height of a substantially vertical arm 230 of the support frame 200. For example, as shown in FIG. 1, an upright member 500 may be attached to a support frame 200 at an end distal to the substantially vertical arm 230. Alternatively, an upright member 500 may be attached to a support frame at an end proximate the substantially vertical arm 230 or, as shown in FIG. 1, an upright member 500 may be attached directly to the substantially vertical arm 230 of a support frame 200.

Welding cart 100 may have two or more upright members 500 (four are shown in the embodiment illustrated in FIG. 1). A pair of upright members 500 may be connected to opposing support frames 200. In one embodiment, two upright members 500 may each be connected to an opposing support frame 200 proximate the substantially vertical arm 230 of the support frame 200. As shown in FIG. 1, a pair of upright members 500 may be connected directly to opposing substantially vertical arms 230 of support frames 200.

Additionally or alternatively, a pair of upright members 500 may each be connected to opposing support frames 200 at an end distal to the substantially vertical arms 230 of the support frames 200. In one embodiment, each upright member 500 may be connected to upper arm 210 or lower arm 220 of the corresponding support frame 200. Each upright member 500 may further be connected to both the upper arm 210 and the lower arm 220 of corresponding support frames 200.

In one embodiment, as shown in FIG. 1, welding cart 100 may include four upright members 500. As shown in FIG. 1, a pair of upright members 500 may each be connected directly to substantially vertical arms 230 of opposing support frames 200 and a pair of upright members 500 may each be connected to an end of opposing support frames 200 distal the substantially vertical arm 230 of the corresponding support frame 200. As shown in FIG. 1, upright members 500 positioned distal the substantially vertical arm 230 may each be connected to both upper arm 210 and lower arm 220 of the corresponding support frame 200 for additional stability.

As shown in FIG. 1, a pair of opposing upright members 500 may be connected to form a tank support 530. As shown in FIG. 1, the terminal ends of a pair of opposing upright members 500 may be connected to form tank support 530. As shown in FIG. 1, tank support 530 may be disposed substantially normal to support frames 200. Tank support 530 may further include a recess 520 configured to receive a gas cylinder. Tank support 530 may further include a chain 522 for securing a gas cylinder in recess 520.

As shown in FIG. 1, one or more upright members 500 may include a handle 510 for steering. Each handle 510 may be disposed at a terminal end of a corresponding upright member 500. As shown in FIG. 1, each handle 510 may further include a grip 512. Each grip 512 may be comprised of rubber, plastic, foam, or any other material that has an increased friction surface. Each grip 512 may be substantially smooth or, as shown in FIG. 1, may include a grip pattern.

Each handle 510 may include a bend 514. The bend may be an S-bend, as shown in FIG. 1, a quarter 90 degree bend, or any other type of bend. As shown in FIG. 1, each bend 514 may be positioned proximate a terminal end of the corresponding upright member 500. As shown in FIG. 6, each bend 514 may extend outward from welding cart 100 such that user interface 840 of welding machine 800 may be easily accessed. As shown in FIG. 1, each bend 514 may extend outward from welding cart 100 at a 45 degree angle, making user interface 840 of welding machine 800 more easily accessible to the user.

6.0 Exemplary Wheels

Welding cart 100 may include a plurality of casters and/or wheels 610, 620 supporting welding cart 100. As shown in FIG. 1, each caster and/or wheel 610, 620 may be operatively connected to lower shelf 300 or support frames 200. As shown in FIG. 1, each caster or wheel 610, 620 may be operatively connected to both lower shelf 300 and a corresponding lower arm 210 of a support frame 200. Each caster and/or wheel 610, 620 may be operatively connected to welding cart 100 via a nut and bolt assembly, cotter pin, or any other suitable attachment mechanism.

One or more of wheels may be casters. For example, as shown in FIG. 1, a pair of casters 610 may be disposed opposite each other at one end of welding cart 100. As shown in FIG. 1, a pair of casters 610 may be disposed proximate one or more upright members 500.

Additionally, or alternatively, one or more pairs of wheels may be connected to the welding cart via an axle. For example, as shown in FIG. 1, a wheel 620 may be disposed at each end of an axle inserted through a hole in lower arm 220 of each support frame 200. In one embodiment, as shown in FIG. 1, welding cart 100 may have two wheels 620 disposed on an axle at one end of welding cart 100 and two casters 610 disposed at the other end of welding cart 100.

7.0 Exemplary Transferable Cable Management System 700

Figure 2:
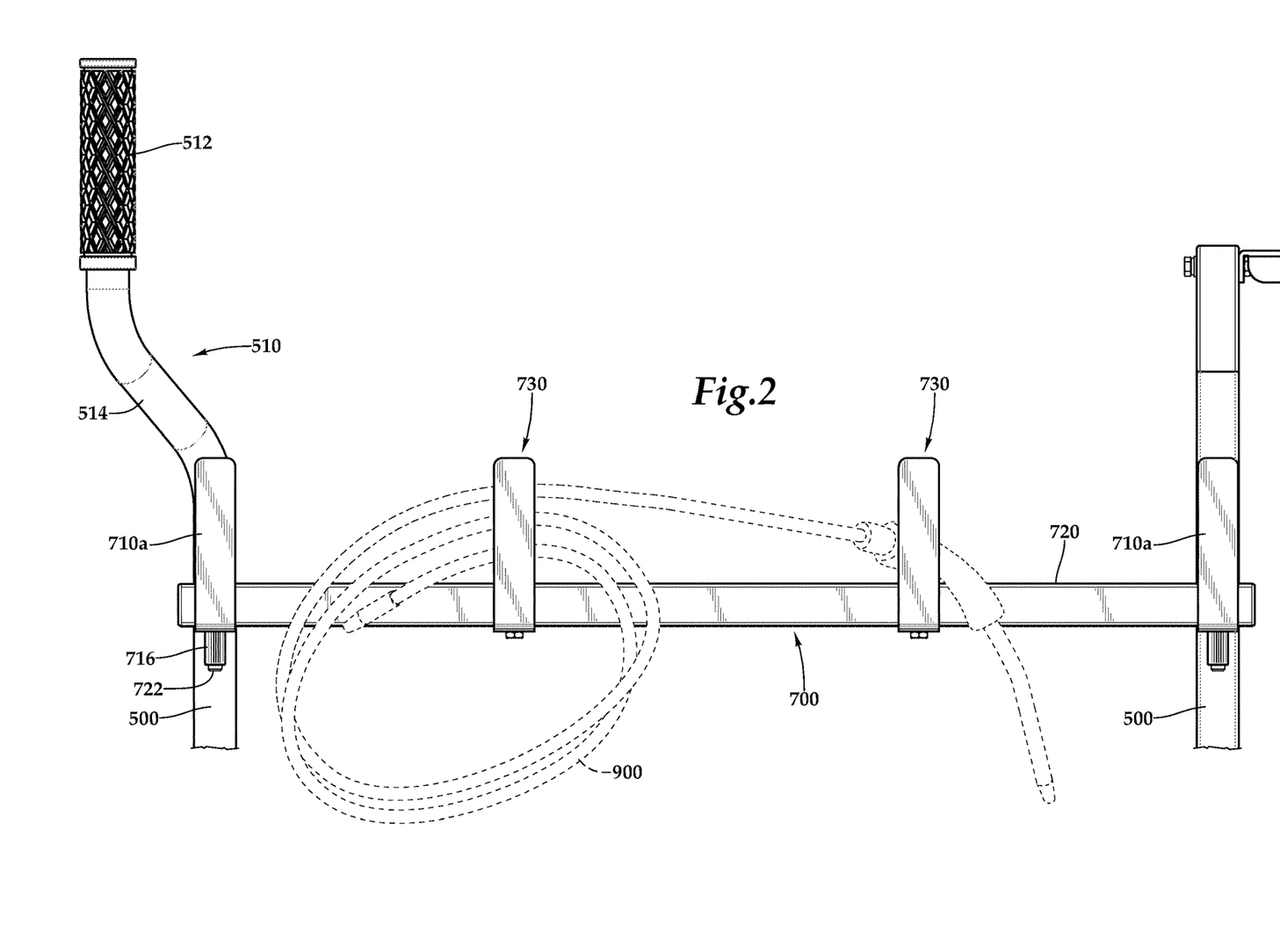
FIG. 2 is a right elevation view of an exemplary cable management system with an exemplary cable illustrated in broken lines.

As shown in FIGS. 1 and 2, welding cart 100 may include a cable management system 700 comprising a bar 720 releasably secured to a first pair of holders 710*a*. Bar 720 may further comprise one or more hooks 730 on which welding tools and accessories, such as a cables 900, may be hung. First pair of holders 710a may be mounted to a side of welding cart 100. For example, as shown in FIGS. 1 and 2, first pair of holders 710a may each be mounted to an adjacent upright member 500.

As shown in FIG. 1, cable management system 700 may further comprise a second pair of holders 710b disposed on a side of welding cart 100. Second pair of holders 710b may be disposed on a different side of welding cart 100 than first pair of holders 710a. As shown in FIG. 1, for example, second pair of holders 710b may be disposed on a side of welding cart 100 opposite first pair of holders 710a. As also illustrated in FIG. 1, second pair of holders 710a may each be mounted to an adjacent upright member 500.

Figure 3A:
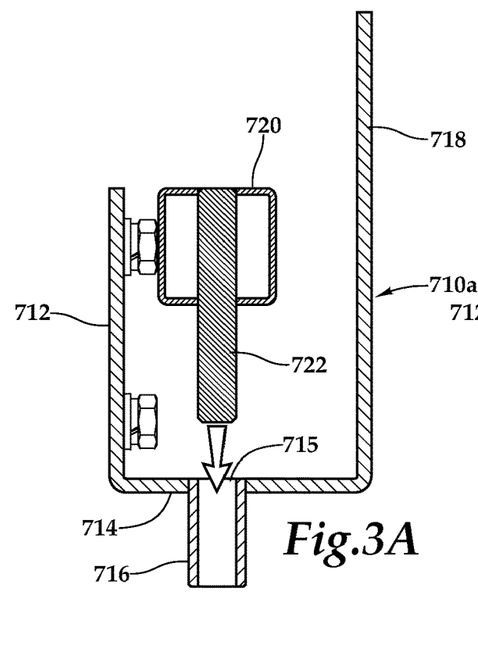
FIG. 3a is a rear cross-section view of an exemplary cable management system showing the pin of a bar being inserted into the hole and sleeve of a holder.
Figure 3B:
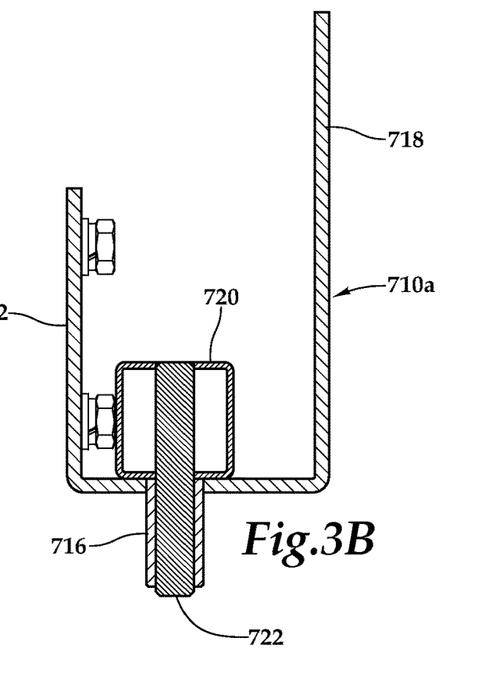
FIG. 3b is a rear cross-section view of an exemplary cable management system showing the pin of a bar releasably secured in the hole and sleeve of a holder.

The bar 720 may be releasably secured to the first pair of holders 710a or the second pair of holders 710b. Additionally, the bar 720 may be freely transferred from first pair of holders 710a to second pair of holders 710b, and back to first pair of holders 710a as necessary. In one embodiment, as shown in FIGS. 3a and 3b, bar 720 may be releasably secured to first pair of holders 710a by a pin-and-hole mechanism 722, 715. For example, as shown in FIG. 3, a hole 715 in each holder 710a may receive a corresponding pin 722 extending from bar 720. Bar 720 may be releasably secured to second pair of holders 710b by a substantially similar pin-and-hole mechanism. For example, a hole in each holder 710b may receive a corresponding pin 722 extending from bar 720.

7.1 Exemplary Holders 710a and 710b

An exemplary cable management system 700 may include one or more pairs of holders 710a, 710b. For example, as shown in FIG. 1, welding cart 100 may include a first pair of holders 710a disposed on a side of the welding cart 100 and a second pair of holders 710b disposed on a side of the welding cart 100. Second pair of holders 710b may be disposed on a different side of welding cart 100 than first pair of holders 710a. For example, as shown in FIG. 1, second pair of holders 710b may be disposed on a side of welding cart 100 opposite first pair of holders 710a.

As shown in FIGS. 3a and 3b, each holder 710a, 710b may include a mounting plate 712 and a support arm 714 extending from mounting plate 712. Each holder 710a, 710b may further include a second arm 718 extending from a side of support arm 714 opposite mounting plate 712. Each support arm 714 may further include a hole 715 adapted to receive a pin 722 extending from a bar 720. Each support arm 714 may even further include a sleeve 716 extending from the hole 715 and adapted to receive the pin 722 extending from the bar 720.

7.1(a) Exemplary Mounting Plate 712

Figures 4, 5:
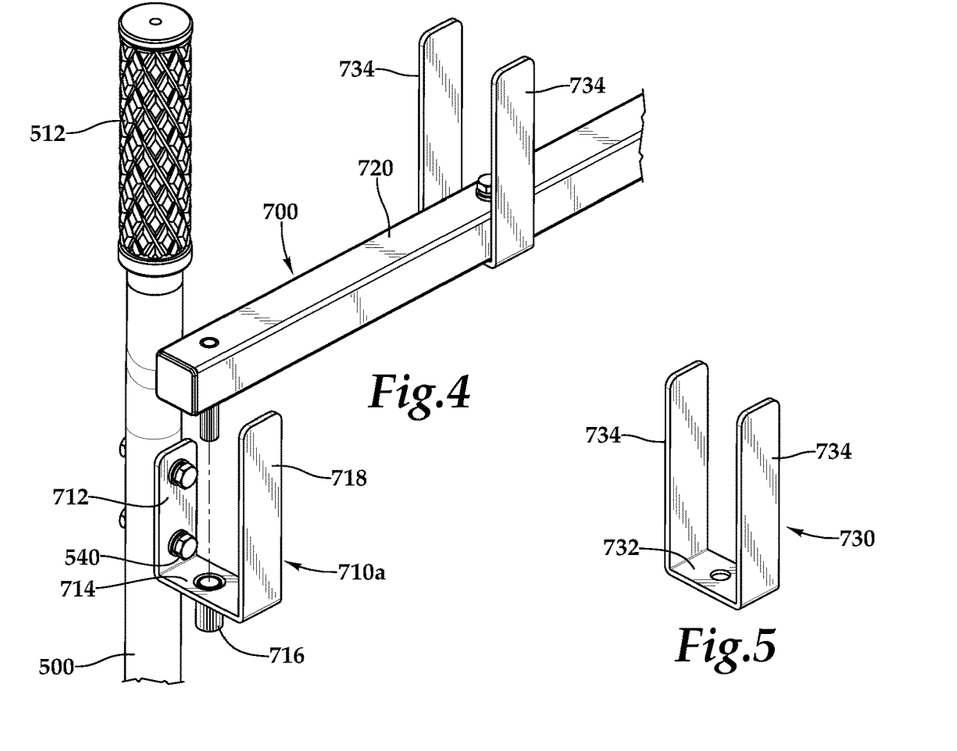
FIG. 4 is a front perspective view of an exemplary cable management system showing the pin of a bar being inserted into the hole and sleeve of a mounted holder.
FIG. 5 is a front perspective view of an exemplary hook of a cable management system.

As shown in FIG. 4, mounting plate 712 of each holder 710a, 710b may be operatively connected to an upright member 500 and positioned on upright member 500 such that support arm 714 of each holder 710a, 710b extends outward away from welding cart 100. Each mounting plate 712 may be operatively connected to the corresponding upright member 500 via a nut and bolt assembly 540, as shown in FIG. 4, a cotter pin, or any other suitable mounting mechanism. Further, as shown in FIG. 4, each holder 710a, 710b may be mounted to an upright member 500 proximate a terminal end of upright member 500.

As shown in FIG. 4, each mounting plate 712 may have a height and a length. For example, the length of each mounting plate may be between about 10 mm and about 50 mm. More preferably, each mounting plate may have a length between about 20 mm and about 40 mm. Even more preferably, each mounting plate may have a length between about 25 mm and about 35 mm. In one embodiment, each mounting plate may have a length of about 30 mm. In one embodiment, each mounting plate may have a length of about 29 mm. In one embodiment, each mounting plate may have a length of about 25 mm.

The height of each mounting plate 712 may be greater than or substantially equal to the height of the bar 720. For example, the height of each mounting plate may be between about 20 mm and about 110 mm. More preferably, the height of each mounting plate may be between about 40 mm and about 80 mm. Even more preferably, the height of each mounting plate may be between about 50 mm and about 70 mm. Even more preferably, the height of each mounting plate may be between about 55 mm and about 65 mm. In one embodiment, the height of the mounting plate may be about 103 mm. In one embodiment, the height of each mounting plate may be about 80 mm. In one embodiment, the height of each mounting plate may be about 60 mm.

7.1(b) Exemplary Support Arm 714

As described above, and as shown in FIG. 4, each holder 710a, 710b may further include a support arm 714 extending from mounting plate 712. As shown in FIG. 4, each support arm 714 may have a length and a width adapted to support a bar 720. The length of each support arm 714 may be greater than or substantially equal to the length of the corresponding mounting plate 712. For example, the length of each support arm may be between about 10 mm and about 50 mm. More preferably, each support arm may have a length between about 20 mm and about 40 mm. Even more preferably, each support arm may have a length between about 25 mm and about 35 mm. In one embodiment, each support arm may have a length of about 30 mm. In one embodiment, each support arm may have a length of about 29 mm. In one embodiment, each support arm may have a length of about 25 mm.

The width of each support arm 714 may be between about 10 mm and about 80 mm. More preferably, the width of each support arm may be between about 30 mm and about 70 mm. Even more preferably, the width of each support arm may be between about 40 mm and about 60 mm. In one embodiment, the width of each support arm may be about 50 mm.

As shown in FIGS. 3a and 3b, each support arm 714 may further comprise a hole 715 adapted to receive a pin 722 extending from a bar 720. Each hole 715 may have a diameter greater than or substantially equal to the diameter of the pin 722 extending from the bar 720. For example, each hole may have a diameter of between about 2 mm and about 20 mm. More preferably, each hole may have a diameter between about 5 mm and about 15 mm. Even more preferably, each hole may have a diameter between about 8 mm and about 13 mm. In one embodiment, each hole may have a diameter of about 10 mm.

In one embodiment, each hole 715 may be disposed at the center of a corresponding support arm 714. Alternatively, as shown in FIGS. 3a and 3b, each hole 715 may be positioned proximate mounting plate 712. In one embodiment, as shown in FIGS. 3a and 3b, a sleeve 716 may extend downward from hole 715. Sleeve 716 may be adapted to receive a pin 722 extending from a bar 720.

Each sleeve 716 may have a diameter substantially equal to the diameter of the corresponding hole 715. Each sleeve may have a height. The height of the sleeve may be between about 2 mm and about 20 mm. More preferably, each sleeve may have a height of between about 5 mm and about 15 mm. Even more preferably, each sleeve may have a height of between about 7 mm and about 12 mm. In one embodiment, each sleeve may have a height of about 10 mm. The sleeve 716 may further terminate in a floor.

7.1(c) Exemplary Second Arm 718

As shown in FIGS. 3a and 3b, each holder 710a, 710b may further include a second arm 718 extending from a side of the support arm 714 opposite the mounting plate 712. Each second arm 718 may be adapted to secure one or more cables on the holder 710a, 710b.

Each second arm 718 may have a height and a length. The height of each second arm may be between about 20 mm and about 130 mm. More preferably, the height of each second arm may be between about 60 mm and about 120 mm. Even more preferably, the height of each second arm may be between about 90 mm and about 110 mm. Even more preferably, the height of each second arm may be between about 100 mm and about 105 mm. In one embodiment, the height of the second arm may be about 103 mm. In one embodiment, the height of each second arm may be about 90 mm. In one embodiment, the height of each second arm may be about 60 mm. The height of each second arm may be greater than or substantially equal to the height of the corresponding mounting plate.

The length of each second arm 718 may be between about 10 mm and about 50 mm. More preferably, each second arm may have a length between about 20 mm and about 40 mm. Even more preferably, each second arm may have a length between about 25 mm and about 35 mm. In one embodiment, each second arm may have a length of about 30 mm. In one embodiment, each second arm may have a length of about 29 mm. In one embodiment, each second arm may have a length of about 25 mm. The length of each second arm may be substantially equal to the length of the corresponding mounting plate.

7.2 Exemplary Bar 720

As described above, and as shown in FIGS. 1 and 2, cable management system 700 may include one or more bars 720 releasably secured to a first pair of holders 710a disposed on a side of welding cart 100 or a second pair of holders 710b disposed on an opposite side of welding cart 100. Bar 720 may provide additional storage space for welding tools and accessories, such as cables.

Bar 720 may have a height, a width, and a length. The bar may have a height between about 10 mm and about 50 mm. More preferably, the bar may have a height between about 20 mm and about 40 mm. Even more preferably, the bar may have a width between about 25 mm and about 35 mm. In one embodiment, the bar may have a height of about 30 mm. In one embodiment, the bar may have a height of about 29 mm. In one embodiment, the bar may have a height of about 25 mm.

The bar may have a width of between about 10 mm and about 50 mm. More preferably, the bar may have a width between about 20 mm and about 40 mm. Even more preferably, the bar may have a width between about 25 mm and about 35 mm. In one embodiment, the bar may have a width of about 30 mm. In one embodiment, the bar may have a width of about 29 mm. In one embodiment, the bar may have a width of about 25 mm.

As shown in FIGS. 3a and 3b, the cross section of bar 720 may have a substantially quadrilateral shape. Bar 720 may be solid or, as shown in FIGS. 3a and 3b, may be hollow. In one embodiment, the height and width of bar 720 may be equal. For example, bar 720 may be formed from standard square bar stock. Bar 720 may be between about 10 mm square and about 50 mm square. More preferably, the bar may be between about 20 mm square and about 40 mm square. Even more preferably, the bar may be between about 25 mm square and about 35 mm square. In one embodiment, the bar may be about 30 mm square. In one embodiment, the bar may be about 29 mm square. In one embodiment, the bar may be about 25 mm square.

Alternatively, bar 720 may have a tubular shape with a diameter between about 10 mm and about 50 mm. More preferably, the bar may have a diameter between about 20 mm and about 40 mm. Even more preferably, the bar may have a diameter between about 25 mm and about 35 mm. In one embodiment, the bar may have a diameter of about 30 mm. In one embodiment, the bar may have a diameter of about 29 mm. In one embodiment, the bar may have a diameter of about 25 mm.

Bar 720 may be releasably secured to a pair holders 710a, 710b such that bar 720 does not slide off the holders 710a, 710b during transport. When necessary, bar 720 may be removed from the holders 710a, 710b or transferred between holders 710a and 710b. Any suitable releasable attachment mechanism may be used to releasably secure each bar 720 to a pair of holders 710a, 710b. For example, as shown in FIGS. 3a and 3b, bar 720 may include one or more pins 722 extending from a side of bar 720 and adapted to fit into a corresponding hole 715 in a holder 710a, 710b.

Each pin 722 may have a diameter. Each pin may have a diameter that is less than or substantially equal to the diameter of a hole in the holder. For example, each pin may have a diameter of between about 2 mm and about 20 mm. More preferably, each pin may have a diameter between about 5 mm and about 15 mm. Even more preferably, each pin may have a diameter between about 8 mm and about 13 mm. In one embodiment, each pin may have a diameter of about 10 mm.

As shown in FIGS. 3a and 3b, each pin 722 may have a height. Each pin may have height of between about 2 mm and about 20 mm. More preferably, each pin may have a height of between about 5 mm and about 15 mm. Even more preferably, each pin may have a height of between about 7 mm and about 12 mm. In one embodiment, each pin may have a height of about 10 mm.

As shown in FIGS. 1 and 2, the length of bar 720 may greater than or substantially equal to the distance between two holes 715 each disposed in a pair of adjacent holders 710a, 710b. As shown in FIG. 2, each pin 722 may be disposed proximate an end of bar 720. As shown in FIGS. 1 and 2, the distance between the pins 722 on bar 720 may be substantially equal to the distance between two holes 715 or sleeves 716 each disposed in adjacent holders 710a, 710b. As such, each pin 722 may fit into a corresponding hole 715 or sleeve 716 in adjacent holders 710a, 710b and bar 720 may be releasably secured in place on holders 710a, 710b, as shown in FIG. 1. If necessary, bar 720 may be temporarily removed from holders 710a, 710b or transferred between holders 710a and 710b.

7.3 Exemplary Hook 730

A shown in FIGS. 1 and 2, each bar 720 may further include one or more hooks 730 adapted to receive welding tools or accessories, such as welding cables 900. As shown in FIG. 5, each hook 730 may include a base 732 and a pair of prongs 734 each extending from opposite sides of base 732 in the same direction. Each hook 730 may be operatively connected to bar 720. In one embodiment, as shown in FIG. 4, each hook 730 may be operatively connected to bar 720 such that prongs 734 of each hook 730 receive bar 720.

As shown in FIG. 5, each prong 734 may have a height and a length. The height of each prong may be between about 20 mm and about 130 mm. More preferably, the height of each prong may be between about 60 mm and about 120 mm. Even more preferably, the height of each prong may be between about 90 mm and about 110 mm. Even more preferably, the height of each prong may be between about 100 mm and about 105 mm. In one embodiment, the height of each prong may be about 103 mm. In one embodiment, the height of each prong may be about 90 mm. In one embodiment, the height of each prong may be about 60 mm. Each prong may have substantially the same height as another prong on the hook.

The length of each prong 734 may be between about 10 mm and about 50 mm. More preferably, each prong may have a length between about 20 mm and about 40 mm. Even more preferably, each prong may have a length between about 25 mm and about 35 mm. In one embodiment, each prong may have a length of about 30 mm. In one embodiment, each prong may have a length of about 29 mm. In one embodiment, each prong may have a length of about 25 mm. Each prong may have substantially the same length as another prong on the hook.

In one embodiment, as shown in FIG. 4, base 732 of hook 730 may be operatively connected to bar 720. Base 732 may be operatively connected to bar 720 via a nut and bolt assembly, a cotter pin, or any other suitable attachment mechanism.

As shown in FIG. 5, base 732 of each hook 730 may have a width and a length. The width of the base may be greater than or substantially equal to the width of the bar. For example, the width of each base may be between about 10 mm and about 80 mm. More preferably, the width of each base may be between about 30 mm and about 70 mm. Even more preferably, the width of each base may be between about 40 mm and about 60 mm. In one embodiment, the width of each base may be about 50 mm.

The length of each base may be between 10 mm and about 50 mm. More preferably, each base may have a length between about 20 mm and about 40 mm. Even more preferably, each base may have a length between about 25 mm and about 35 mm. In one embodiment, each base may have a length of about 30 mm. In one embodiment, each base may have a length of about 29 mm. In one embodiment, each base may have a length of about 25 mm.

As shown in FIG. 2, each prong may be adapted to receive and store a welding tool or accessory, such as a welding cable 900, and prevent the cable 900 disposed on hook 730 from sliding off hook 730 and falling to a side of bar 720 or falling off the welding cart 100 entirely.

Each bar may include one hook or a plurality of hooks. For example, a bar 720 may include one hook 730. In one embodiment, as shown in FIGS. 1 and 2, bar 720 may include two or three hooks 730 each positioned at a different point along the length of bar 720. In one embodiment, a plurality of hooks 730 may be evenly spaced along the length of the bar 720.

7.4 Transferability of Cable Management System 700

As described above, wire feed welding machines may house wire spools that are accessed by lifting a door on the side of the welding machine. Objects placed in front of the door may block the door from opening, thereby impeding replacement of the wire spool. Because different welding machines have doors on different sides, a fixed rack disposed on one side of the cart may limit the compatibility of the cart.

As shown in FIG. 6, if the welding cart 100 is being used with a welding machine 800 that has a door 830 located on the side of the welding machine 800, then the bar 720 may be releasably secured to a first pair of brackets 710a disposed on a side of the welding cart 100 opposite the door 830 of the welding machine 800, such that the door 830 may be freely opened and closed. The bar 720 may include one or more hooks 730 for storing welding tools and accessories, such as welding cables 900. The bar may also be removed from the first pair of brackets 710a and/or freely transferred between the first pair of brackets 710a and the second pair of brackets 710b as needed. The bar may further be removed from the second pair of brackets 710b and/or freely transferred between the second pair of brackets 710b and the first pair of brackets 710a as needed.

A welding cart with a cable management system, as fully described above, may therefore provide additional, easily accessible storage space for welding tools and accessories while being compatible with a wide variety of portable welding machines.

One way of describing a welding cart with a cable management system is as follows: a welding cart may have four sides and a base having a length and a width. The base may also have four sides. The welding cart may have a pair of support frames. Each support frame may include an upper arm, a lower arm, and a substantially vertical arm connecting one end of the upper arm to one end of the lower arm. The lower arm of a support frame may be attached to one side of the base and the lower arm of the other support frame may be attached to an opposing side of the base. The welding cart may include an upper shelf attached to the upper arm of each side support. The upper shelf may be adapted to support a welding machine. The welding cart may include a plurality of upright members. At least one upright member may be attached to one side support and at least one upright member may be attached to an opposing side support. The welding cart may further comprise a plurality of wheels supporting the cart.

The welding cart may also include a cable management system. The cable management system may include a first pair of holders each having a mounting arm and a base extending outward away from the base. The mounting arm of each holder may be attached to a separate upright member. The base of each holder may be disposed substantially perpendicular to the mounting arm. The cable management system may further include a removable bar having a length and at least one hook. The transferable bar may be supported by the first pair of holders. The removable bar may be temporarily removed from the first pair of holders.

Another way of describing the welding cart having a cable management system is as follows: a welding cart may have a frame, an upper shelf adapted to support a welding machine, a plurality of upright members, a plurality of wheels supporting the cart, a first pair of holders disposed on a side of the cart and each having a mounting plate mounted to a side of the welding cart and a support arm protruding from the mounting plate and having a hole, a second pair of holders disposed on an opposite side of the cart and each having a mounting plate mounted to a side of the welding cart and a support arm protruding from the mounting plate and having a hole, and a bar having a hook and at least two pins each disposed proximate opposing ends of the bar. Each hole in a support arm may be adapted to releasably receive a corresponding pin of the bar such that the bar may be transferred from the first pair of holders to the second pair of holders.

In one embodiment, each holder may be mounted to an upright member.

In one embodiment, the bar may be releasably secured to the first pair of holders and/or the second pair of holders by a pin-and-hole mechanism. The pin-and-hole mechanism may include the hole disposed in the support arm of a holder and a pin extending from the bar. The hole of the support arm may be adapted to releasably receive the pin of the bar.

In one embodiment, the support arm may further includes a sleeve extending from the hole. The sleeve may be adapted to releasably receive the pin of the bar. The sleeve may further terminate in a floor.

In one embodiment, each holder may further comprise a second arm extending upward from a side of the support arm opposite the mounting plate. The second arm may be adapted to secure welding cables on the holder.

In one embodiment, the at least one hook of the bar further includes an upwardly extending prong adapted to secure welding cables on the hook.

Yet another way of describing a welding cart having a cable management system is as follows: a welding cart may have a frame defining opposing first and second sides. Said first side may define a first front corner and a first rear corner. Said second side may define a second front corner and a second rear corner. Said frame may include a plurality of upright members with one each of said plurality of upright members being disposed proximate each of said first and second front corners and said first and second rear corners. A shelf may be disposed between said frame first and second sides. Said shelf may be configured to support a conventional welding machine. A plurality of holders may be disposed on said frame. Said plurality of holders may include at least first and second holders disposed on two of said plurality of upright members. Said two of said plurality of upright members may be disposed on one of said opposing first and second sides of said frame. A bar may define a first end and a second end and may be configured to be selectively mountable on and extending between said first and second holders. Said first end may engage said first holder and said second end may engage said second holder.

In one embodiment, said bar may include at least one accessory holder configured to releasably receive at least one conventional welding accessory.

In one embodiment, each of said plurality of holders may be further configured to releasably receive at least one welding accessory.

In one embodiment, each of said plurality of holders may define a first mating portion and each of said first and second ends of said bar may define a second mating portion. Said first mating portion and said second mating portion each may be configured to be cooperatively engaged to releasably secure said bar first and second ends to said first and second holders.

In one embodiment, said first mating portion may be a receptacle and said second mating portion may be a post configured to be closely received within said receptacle. Each said receptacle and said each said post may define a cylinder of a selected cross-sectional shape.

In one embodiment, said plurality of holders may include a first pair of holders. Said first pair of holders may include said first holder disposed on said upright member disposed proximate said first front corner of said frame and said second holder disposed on said upright member disposed proximate said first rear corner of said frame. Said plurality of holders may include a second pair of holders including said first holder disposed on said upright member disposed proximate said second front corner of said frame and said second holder disposed on said upright member disposed proximate said second rear corner of said frame. Said bar may be selectively secured to either of said first pair of holders and said second pair of holders in order to selectively orient said bar in one of a first orientation on said first side of said frame and a second orientation on said second side of said frame.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A welding cart having a cable management system, comprising:
    a frame defining opposing first and second sides, said first side defining a first front corner and a first rear corner, said second side defining a second front corner and a second rear corner, said frame including one or more horizontal arms and a plurality of upright members with each of said plurality of upright members being disposed proximate each of said first and second front corners and said first and second rear corners; and
    a generally solid planar shelf extending from said first side to said second side of said frame and extending past upright members disposed proximate said first and second rear corner, said shelf supported by said one or more horizontal arms of said frame to support a conventional welding machine, wherein said shelf includes one or more tabs extending upwardly from said shelf, said one or more tabs configured to secure the welding machine.

2. The welding cart of claim 1, further comprising a plurality of holders disposed on said frame, said plurality of holders including at least a pair of holders disposed on at least one of said first side or said second side of said frame.

3. The welding cart of claim 2, further comprising a bar defining a first end and a second end and being configured to selectively mount on and extend between said pair of holders.

4. The welding cart of claim 3, further comprising one or more hooks removably coupled to said bar, wherein said hooks are configured to receive at least one of a tool and accessory.

5. The welding cart of claim 2, wherein each of said plurality of holders is further configured to releasably receive at least one welding accessory.

6. The welding cart of claim 3, wherein each of said plurality of holders defines a first mating portion and each of said first and second ends of said bar defines a second mating portion, said first mating portion and said second mating portion each being configured to be cooperatively engaged to releasably secure said bar to said pair of holders.

7. The welding cart of claim 6, wherein said first mating portion is a receptacle and said second mating portion is a post configured to be closely received within said receptacle, wherein each said receptacle and said each said post defines a cylinder of a selected cross-sectional shape.

8. The welding cart of claim 2, wherein said plurality of holders includes:
    a first pair of holders including a first holder disposed on said upright member disposed proximate said first front corner of said frame and a second holder disposed on said upright member disposed proximate said first rear corner of said frame, and
    a second pair of holders including a first holder disposed on said upright member disposed proximate said second front corner of said frame and a second holder disposed on said upright member disposed proximate said second rear corner of said frame, wherein said bar is selectively secured to either of said first pair of holders and said second pair of holders in order to selectively orient said bar in one of a first orientation on said first side of said frame and a second orientation on said second side of said frame.

9. The welding cart of claim 1, wherein said one or more tabs are stationary tabs configured to secure the welding machine.

10. The welding cart of claim 1, wherein said one or more tabs are adjustable tabs configured to slide along said shelf via one or more slots, said adjustable tabs configured to secure the welding machine.

11. The welding cart of claim 1, wherein said shelf includes a recess configured to receive a gas cylinder.

12. The welding cart of claim 1, wherein said shelf is supported at an angle such that a front end of said shelf is positioned higher than a rear end of said shelf.

13. The welding cart of claim 1, wherein said shelf is supported at an angle such that a rear end of said shelf is positioned higher than a front end of said shelf.

14. The welding cart of claim 1, further comprising a compartment extending from a bottom of said shelf, said compartment configured to hold a toolbox.

15. The welding cart of claim 1, wherein said frame further includes one or more lower arms, said one or more lower arms configured to support a lower shelf.

16. The welding cart of claim 15, wherein said lower shelf is generally planar and extending from said first side to said second side of said frame and extending past upright members disposed proximate said first and second rear corner.

17. The welding cart of claim 15, wherein an edge of said shelf includes a lip or stopper.

18. The welding cart of claim 15, wherein said one or more lower arms is configured to couple with at least one of a caster and a wheel.

19. The welding cart of claim 4, wherein each hook includes a pair of prongs, said prongs extending from a base of each hook.

20. The welding cart of claim 1, wherein two of said plurality of upright members form a tank support above said shelf.

21. A welding cart having a cable management system, comprising:

a frame defining opposing first and second sides, said first side defining a first front corner and a first rear corner, said second side defining a second front corner and a second rear corner, said frame including one or more horizontal arms and a plurality of upright members with each of said plurality of upright members being disposed proximate each of said first and second front corners and said first and second rear corners; and a generally solid planar shelf extending from said first side to said second side of said frame and extending past upright members disposed proximate said first and second rear corner, said shelf supported by said one or more horizontal arms of said frame to support a conventional welding machine, said shelf further including one or more stationary tabs configured to secure the welding machine.

22. A welding cart having a cable management system, comprising:

a frame defining opposing first and second sides, said first side defining a first front corner and a first rear corner, said second side defining a second front corner and a second rear corner, said frame including one or more horizontal arms and a plurality of upright members with each of said plurality of upright members being disposed proximate each of said first and second front corners and said first and second rear corners; and a generally solid planar shelf extending from said first side to said second side of said frame and extending past upright members disposed proximate said first and second rear corner, said shelf supported by said one or more horizontal arms of said frame to support a conventional welding machine, said shelf further including one or more adjustable tabs configured to slide along said shelf via one or more slots and secure the welding machine.

23. A welding cart having a cable management system, comprising:

a frame defining opposing first and second sides, said first side defining a first front corner and a first rear corner, said second side defining a second front corner and a second rear corner, said frame including one or more horizontal arms and a plurality of upright members with each of said plurality of upright members being disposed proximate each of said first and second front corners and said first and second rear corners;

a generally solid planar shelf extending from said first side to said second side of said frame and extending past upright members disposed proximate said first and second rear corner, said shelf supported by said one or more horizontal arms of said frame to support a conventional welding machine; and a compartment extending from a bottom of said shelf, said compartment configured to hold a toolbox.

* * * * *